United States Patent
Miyazaki et al.

(10) Patent No.: US 6,773,122 B2
(45) Date of Patent: Aug. 10, 2004

(54) OPTICAL FILM CONTAINING ANTI-GLARE LAYER AND IMAGE DISPLAY APPARATUS USING THE SAME

(75) Inventors: Keiichi Miyazaki, Kanagawa (JP); Tsutomu Arai, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/254,773

(22) Filed: Sep. 26, 2002

(65) Prior Publication Data

US 2003/0063387 A1 Apr. 3, 2003

(30) Foreign Application Priority Data

Sep. 28, 2001 (JP) ..................... P. 2001-303319

(51) Int. Cl.[7] .............................. G02B 27/00
(52) U.S. Cl. ..................... 359/613; 359/601; 359/602; 359/603; 359/604; 359/614
(58) Field of Search ................... 359/601–614

Primary Examiner—Mohammad Sikder
(74) Attorney, Agent, or Firm—Sughrue Mion, PLLC

(57) ABSTRACT

An optical film containing an anti-glare layer having irregularities on a surface thereof, wherein the irregularities are arranged such that the value of NN determined by the sequence of the following steps is 1,000 or less: dividing the irregular surface of the optical film into 10,000 planes; calculating, for each divided plane, the standard deviation D of the distance between positions where adjacent high or low spots have peaks; determining the mean value M for the values of the standard deviation D; and determining the number NN of divided planes for which the value of the standard deviation D is 50% of the mean value M or lower; and, wherein the frequency at which the angle of inclination to the regular reflecting plane as measured with an aperture of two square microns is 0.5 or less degrees is 2% or lower.

8 Claims, 3 Drawing Sheets

OPTICAL FILM CONTAINING ANTI-GLARE LAYER AND IMAGE DISPLAY APPARATUS USING THE SAME

BACKGROUND OF THE INVENTION

This invention relates to an optical film containing an anti-glare layer that is to be provided at the front of a liquid-crystal display, a plasma display or a CRT display in order to control the direction of external illumination or improve the visibility of texts or graphics being presented on the displays. The present invention also relates to an image display apparatus using the optical film.

The anti-glare layer as commonly used with image display apparatus such as a liquid-crystal display, a plasma display and a CRT display is primarily intended to prevent unwanted image formation or contrast drop due to reflection of extraneous light on the display's surface. To this end, asperities are formed on the surface of the anti-glare layer so that it has lower reflectance due to principles such as surface scattering and optical interference; the so treated anti-glare layer is provided on the outermost surface of the display.

The front face of the liquid-crystal display or the CRT display may itself be rendered anti-glare property. To this end, asperities are formed on the surface of a layer by various techniques including coating with a resin containing transparent particles, sandblasting and embossing. The resulting layer scatters regular reflected light so that its amount is sufficiently reduced to achieve the intended anti-glare property.

However, whichever method is used, there still remain surfaces that are oriented parallel to the regular reflecting plane shown in FIG. 1, in which reference numeral 11 designates the external light source, 12 is the display, 13 is the eye point, and 14 is the screen which serves as the regular reflecting plane. Obviously, one cannot eliminate the regular reflection which has been deleterious to the visibility of texts and graphics being presented on the display.

SUMMARY OF THE INVENTION

The present inventors conducted intensive studies in order to solve the aforementioned problem of the prior art and improve the visibility of texts and graphics being presented on the display. As a result, they successfully developed an anti-glare layer capable of controlling the direction of light which is externally illuminating the display.

An object, therefore, of the present invention is to provide an optical film containing the anti-glare layer.

Another object of the present invention is to provide an image display apparatus using the optical film.

The first object of the invention can be attained by optical films containing anti-glare layers that are to be placed at the front of a display and which have the following characteristics.

According to the first object of the present invention, there is provided a first aspect of the present invention is a An optical film containing an anti-glare layer having irregularities on a surface thereof in the form of high or low spots, wherein the irregularities are arranged such that the value of NN determined by the sequence of the following steps of (i) to (iv) is 1,000 or less: (i) dividing the irregular surface of the optical film into 10,000 planes consisting of 100 planes on each side; (ii) calculating, for each divided plane, the standard deviation D of the distance between positions where adjacent high or low spots have peaks; (iii) determining the mean value M for the values of the standard deviation D for the 10,000 divided planes; and (iv) determining the number NN of divided planes for which the value of the standard deviation D is 50% of the mean value M or lower; and, wherein the frequency at which the angle of inclination to the regular reflecting plane as measured with an aperture of two square microns is 0.5 or less degrees is 2% or lower.

A second aspect of the present invention is an optical film containing an anti-glare layer having irregularities on a surface thereof in the form of high or low spots, wherein the irregularities are arranged such that the value of NN determined by the sequence of the following steps of (i) to (iv) is 1,000 or less: (i) dividing the irregular surface of the optical film into 10,000 planes consisting of 100 planes on each side; (ii) calculating, for each divided plane, the standard deviation D of the distance between positions where adjacent high or low spots have peaks; (iii) determining the mean value M for the values of the standard deviation D for the 10,000 divided planes; and (iv) determining the number NN of divided planes for which the value of the standard deviation D is 50% of the mean value M or lower; and, wherein the frequency at which the angle of inclination to the regular reflecting plane as measured on a one-square-micron basis is at least 0.25 degrees is 98% or higher.

A third aspect of the present invention is a optical film containing an anti-glare layer as set forth in the first aspect or the second aspect above, wherein a half-width relative to maximum peak of the distribution of the angle of inclination relative to the regular reflecting plane as measured on a one-square-micron basis is 1 degree or lower.

A fourth aspect of the present invention is a optical film containing an anti-glare layer as set forth in any one of the first to third aspects above, wherein shapes of the high or low spots on the surface are each in a conical shape having a circular or elliptical plane base.

The second object of the present invention can be attained by the following. According to the second object of the present invention, there is provided a fifth aspect of the present invention is a image display apparatus using the optical film containing an anti-glare layer as set forth in any one of the first to fourth aspect of the present invention above.

In the present invention, the optical films are used in sizes ranging from 1 cm to 50 cm on one side or in diameters ranging from 1 cm to 50 cm.

DETAILED DESCRIPTION OF THE PREFERRED EMBODIMENTS

The present invention is described below in detail with reference to the preferred embodiment which is given here for illustrative purposes only and is by no means taken to limit the scope of the present invention.

The anti-glare layer which is the characterizing portion of the present invention is described below with reference to accompanying drawings.

The surfaces of solid materials can be micro-machined to produce 3D patterns by various techniques including with excimer laser machining, micro-EDM, ion-beam etching and photoetching. The following description of the machining process is directed to the anti-glare layer fabricated by using an excimer laser. However, it should be understood that an optimum machining process to adopt varies with the size and depth of the desired surface topology and methods other than the excimer laser can of course be used in the present invention.

Figure 1:
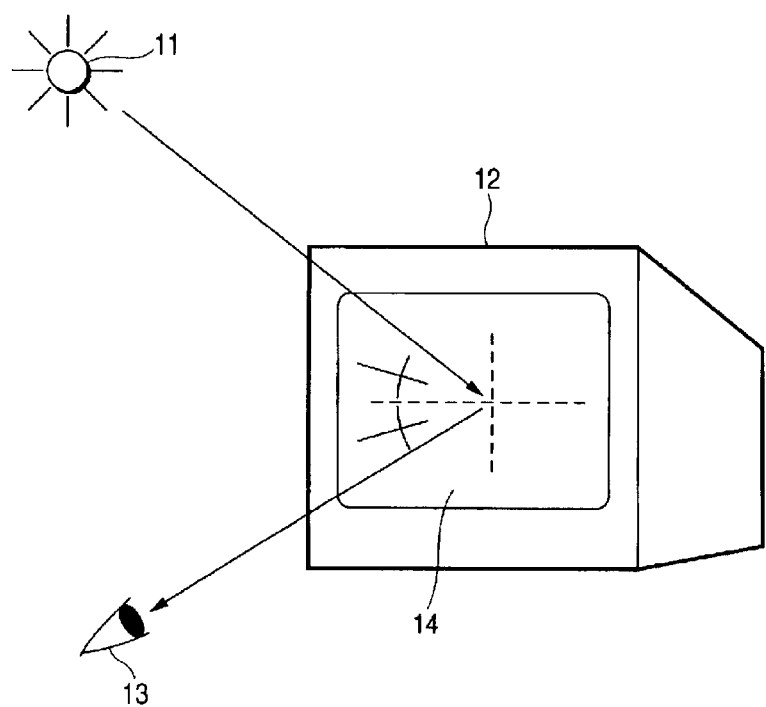
FIG. 1 illustrates how external illumination incident on a display's screen undergoes regular reflection.
Figure 2:
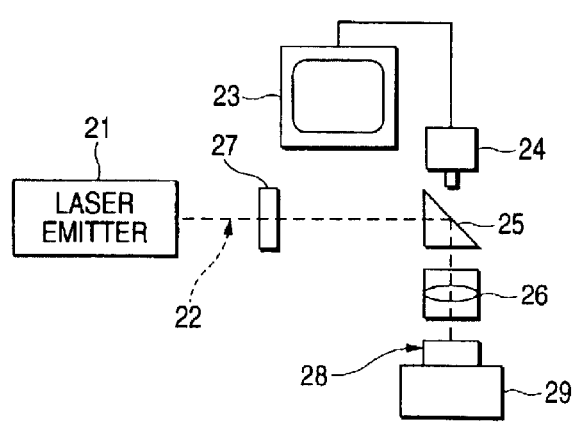
FIG. 2 shows a layout of an excimer laser machining apparatus.

FIG. 2 shows a layout of an excimer laser machining apparatus that may be used to fabricate an anti-glare layer of the type set forth in (iv) in above the first and second aspects, wherein shapes of the high or low spots on the surface are each in a conical shape having a circular or elliptical plane base. The apparatus comprises a laser emitter 21, an excimer laser 22, a monitor 23, a CCD camera 24, a mirror 25, a lens 26, a mask 27, the work 28 and an X-Y-Z stage 29. The excimer (excited dimer) laser oscillates nano-second pulses in the uv range which, when applied to polymeric materials, induce ablation that enables machining to very small feature sizes.

Figure 3:
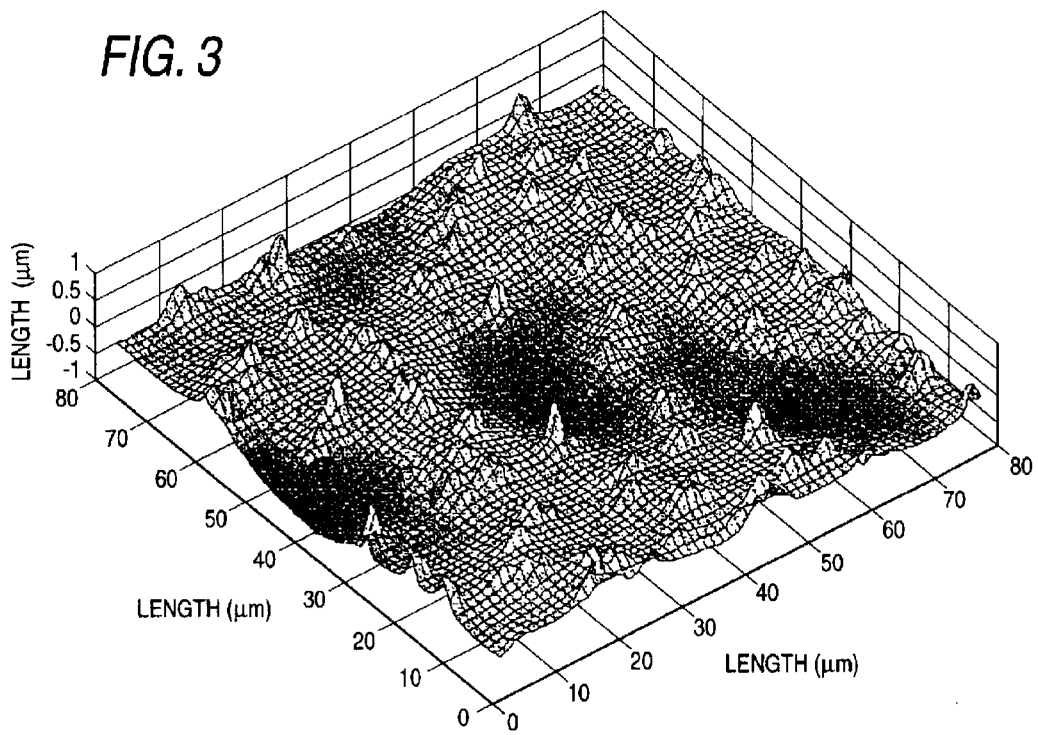
FIG. 3 is a 3D representation of the surface topology of a prior art anti-glare layer.

FIG. 3 shows a 3D representation of the surface topology of an anti-glare layer fabricated by the resin coating technique which is one of the prior art methods. It is the result of a measurement on an 80 $\mu$m×80 $\mu$m region with an aperture of about two square microns. Obviously, the analyzed surface consists of variously inclined planes including the apices of peaks and the bottoms of valleys that are parallel to the regular reflecting plane. The surface has anti-glare quality but on account of its tendency to give the most intense reflected light in the direction of regular reflection, the texts and graphics being presented on a display are only poorly visible.

Figure 4:
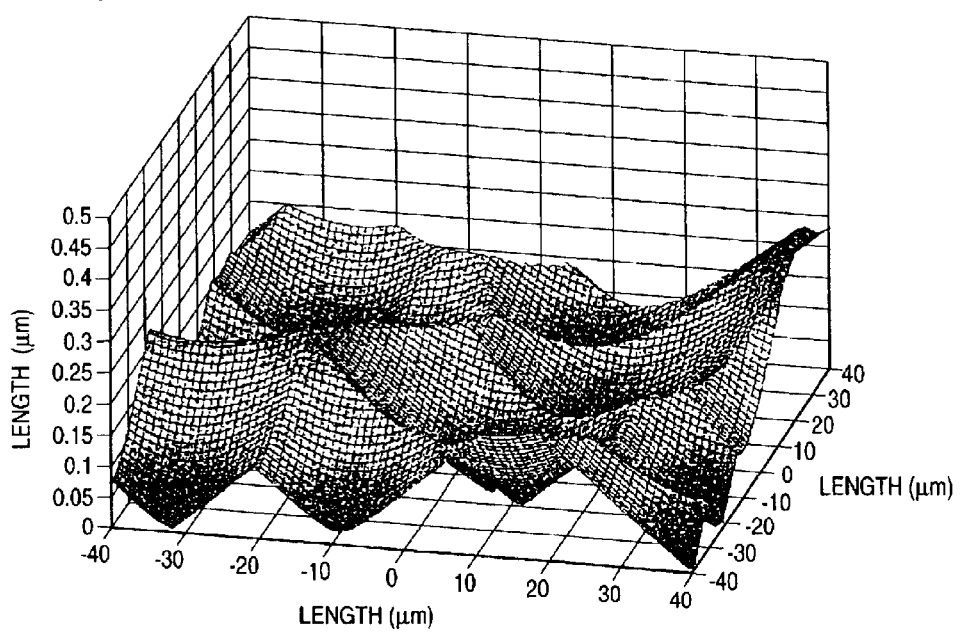
FIG. 4 is a 3D representation of the surface topology of the anti-glare layer of the present invention.

FIG. 4 is a 3D representation of the surface topology of an anti-glare layer fabricated in accordance with the present invention using the excimer laser machining apparatus shown in FIG. 2. Obviously, the analyzed surface has a number of cones that only have inclined planes at 0.5 degrees and all of which are randomly positioned to overlap with one another. The angle of inclination can be controlled over a wide range by adjusting the gradation of the mask. The anti-glare layer of the present invention is attached to an optical film either alone or in combination with a transparent base and the assembly is put on an image display apparatus such as a liquid-crystal display (LCD), a plasma display (PDP), an electroluminescent display (ELD) or a cathode-ray tube (CRT) display. A visibility test was conducted with the anti-glare layer attached to the screen of an image display apparatus; in substantial absence of regular reflected light, there was a positive improvement in the visibility of texts and graphics being presented on the display with the anti-glare layer as shown in FIG. 4.

Figure 5:
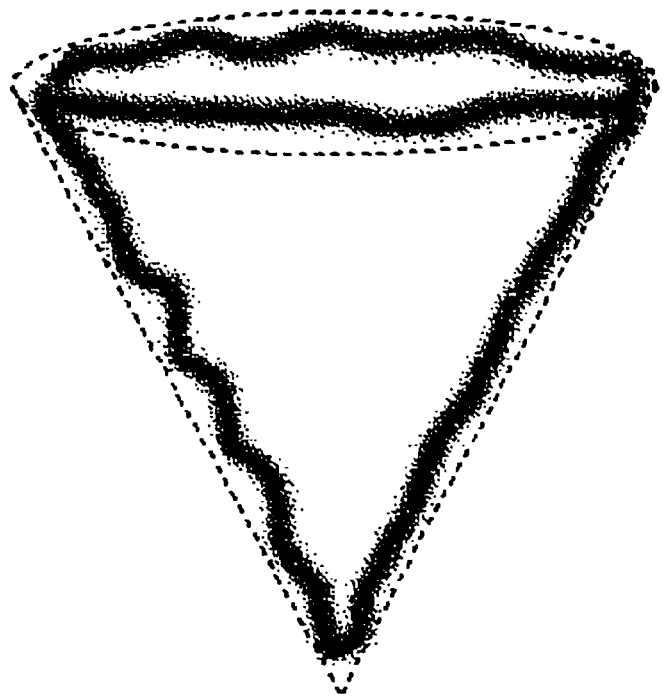
FIG. 5 is an illustration of a distorted cone.

Visibility on the screen is highly sensitive to the surface topology of the anti-glare layer. If the distance between peaks or valleys comes to have periodicity, color bleeding occurs; if the surface consists of pyramids rather than cones, ghost occurs. However, visibility is not very much affected if the cone is distorted as shown in FIG. 5.

By using the optical film containing the anti-glare layer of the present invention, the visibility of texts and graphics can be prevented from degrading even if they are looked at from the direction in which the light externally illuminating the display undergoes regular reflection. The optical film has the additional advantage of improving display quality of various image display apparatus including a CRT display and a liquid-crystal display.

What is claimed is:

1. An optical film containing an anti-glare layer having irregularities on a surface thereof in the form of high or low spots, wherein the irregularities are arranged such that the value of NN determined by the sequence of the following steps of (i) to (iv) is 1,000 or less:

(i) dividing the irregular surface of the optical film into 10,000 planes consisting of 100 planes on each side;

(ii) calculating, for each divided plane, the standard deviation D of the distance between positions where adjacent high or low spots have peaks;

(iii) determining the mean value M for the values of the standard deviation D for the 10,000 divided planes; and (iv) determining the number NN of divided planes for which the value of the standard deviation D is 50% of the mean value M or lower; and, wherein the frequency at which the angle of inclination to the regular reflecting plane as measured with an aperture of two square microns is 0.5 or less degrees is 2% or lower.

2. An optical film containing an anti-glare layer having irregularities on a surface thereof in the form of high or low spots, wherein the irregularities are arranged such that the value of NN determined by the sequence of the following steps of (i) to (iv) is 1,000 or less:

(i) dividing the irregular surface of the optical film into 10,000 planes consisting of 100 planes on each side;

(ii) calculating, for each divided plane, the standard deviation D of the distance between positions where adjacent high or low spots have peaks;

(iii) determining the mean value M for the values of the standard deviation D for the 10,000 divided planes; and (iv) determining the number NN of divided planes for which the value of the standard deviation D is 50% of the mean value M or lower; and, wherein the frequency at which the angle of inclination to the regular reflecting plane as measured on a one-square-micron basis is at least 0.25 degrees is 98% or higher.

3. The optical film containing an anti-glare layer according to claim 1, wherein a half-width relative to maximum peak of the distribution of the angle of inclination relative to the regular reflecting plane as measured on a one-square-micron basis is 1 degree or lower.

4. The optical film containing an anti-glare layer according to claim 2, wherein a half-width relative to maximum peak of the distribution of the angle of inclination relative to the regular reflecting plane as measured on a one-square-micron basis is 1 degree or lower.

5. The optical film containing an anti-glare layer according to claim 1, wherein shapes of the high or low spots on the surface are each in a conical shape having a circular or elliptical plane base.

6. The optical film containing an anti-glare layer according to claim 2, wherein shapes of the high or low spots on the surface are each in a conical shape having a circular or elliptical plane base.

7. An image display apparatus using the optical film containing the anti-glare layer according to claim 1.

8. An image display apparatus using the optical film containing the anti-glare layer according to claim 2.

* * * * *